United States Patent [19]
Tanaka et al.

[11] Patent Number: 5,480,362
[45] Date of Patent: Jan. 2, 1996

[54] DOUBLE PLANETARY CARRIER

[75] Inventors: Haruo Tanaka; Noriaki Takahashi; Tetsuo Suzuki, all of Sayama, Japan

[73] Assignee: Honda Giken Kogyo Kabushiki Kaisha, Tokyo, Japan

[21] Appl. No.: 111,059

[22] Filed: Aug. 24, 1993

[30] Foreign Application Priority Data

Sep. 3, 1992 [JP] Japan .................................. 4-235688
Jul. 28, 1993 [JP] Japan .................................. 5-186334

[51] Int. Cl.⁶ ...................................................... F16H 3/44
[52] U.S. Cl. .......................... 475/346; 475/325; 475/338
[58] Field of Search .................................... 475/323, 325, 475/338, 341, 346, 160

[56] References Cited

U.S. PATENT DOCUMENTS 4,391,163  7/1983  Benthoke et al. ...................... 475/346

FOREIGN PATENT DOCUMENTS 54-117464  8/1979  Japan .

Primary Examiner—Charles A. Marmor
Assistant Examiner—Troy Grabow
Attorney, Agent, or Firm—Armstrong, Westerman, Hattori, McLeland & Naughton

[57] ABSTRACT

A double planetary carrier is constructed by providing separate carriers for carrying therein two sets of planet gears which are axially set apart from each other, and by connecting the two carriers together. A cylindrical portion is formed on a periphery of a side plate of one of the carriers to receive therein a side plate of the other carrier. Serrated teeth are formed respectively on a periphery of the side plate and on the cylindrical portion to connect the two carriers by means of serrations. The serrated teeth are formed so as to have a play therebetween. Between the side plates there are formed radially extending oil grooves to introduce lubricating oil into oil holes which are formed in gear shafts of the planet gears.

4 Claims, 5 Drawing Sheets

DOUBLE PLANETARY CARRIER

BACKGROUND OF THE INVENTION

1. Field of the Invention

The present invention relates to a double planetary carrier for carrying therein two sets of planet gears which are axially set apart from each other.

2. Description of Related Art

As this kind of double planetary carrier, there is conventionally known one in Japanese Published Unexamined Utility Model Registration Application No. 121451/1987. In this carrier, three pieces of side plates are disposed with an axial distance from each other. These side plates are integrally connected together via intermediate pieces which are interposed among the side plates. Planet gears are carried in a respective space between the intermediate side plate and the two side plates which are positioned on axially both outer sides thereof.

In an ordinary planetary carrier for carrying therein one set of planet gears, its assembling is carried out as follows. Namely, planet gears are inserted into the space between a pair of side plates which are connected together via intermediate pieces. Gear shafts for rotatably supporting the gears are then assembled to extend across both side plates. Both ends of the gear shafts are thereafter caulked to fix the gear shafts to the carrier.

However, in the above-described conventional double planetary carrier in which three pieces of side plates are integrally connected together, it is impossible to caulk those fitting ends of the gear shafts against the intermediate side plate. Therefore, the fitting ends of the gear shafts against the outer side plates have to be welded to the outer side plates to fix the gear shafts to the carrier. It follows that the welding of the gear shafts is time-consuming and the productivity becomes poor.

In order to eliminate this kind of disadvantage, the following arrangement may be considered. Namely, two pieces of carriers, each having a pair of side plates which are connected together via intermediate pieces, are provided so as to carry planet gears in each of them, and these two carriers are connected together to constitute a double planetary carrier. In this case, however, the problem will be how the relative positional accuracy between the two sets of planet gears can be secured. In other words, in the double planetary carrier of the above-described conventional example, since the gear shafts of the two sets of planet gears are respectively fitted onto the intermediate side plate, the relative positional accuracy of the two sets of planet gears can be secured with the intermediate side plate serving as a reference or a basis. However, in case the two sets of planet gears are to be carried by separate carriers, it becomes difficult to maintain the relative positional accuracy of the two sets of planet gears due to manufacturing tolerance of each carrier, positioning tolerance in connecting the carriers together, or the like.

In view of the above-described disadvantages, the present invention has a first object of providing a double planetary carrier in which two sets of planet gears are carried in separate carriers and in which the relative positional accuracy between the two sets of planet gears can also be secured.

Further, the lubrication between the gear shafts for rotatably supporting the planet gears and the planet gears is conventionally carried out in the following manner. Namely, each gear shaft is supported in a throughgoing manner by penetrating it through side plates of the carrier. A bottomed oil hole is drilled on an end surface of each gear shaft so as to extend along the axial line of the gear shaft. A small oil hole is provided to communicate a substantially central portion of a cylindrical surface, which is a bearing portion of the gear shafts, with the oil hole to thereby supply the bearing portion with lubricating oil from the oil hole via the small oil hole. However, the lubricating oil will not enter the oil hole by simply opening the oil hole in the end surface of each gear shaft. As a solution, as described in Japanese Published Unexamined Utility Model Registration Application No. 117464/1979, the following arrangement is known. Namely, a ring-like thin plate which covers, with a clearance, an end surface of each gear shaft is mounted such that its peripheral edge is closely attached to a side plate of a carrier. A pocket-like space, to which an opening portion of an oil hole faces, is formed so that the lubricating oil entering the pocket-like space through centrifugal force can be introduced into the oil hole.

Suppose that the above-described conventional lubricating means is applied to the double planetary carrier which carries therein two sets of axially set apart planet gears as described in the above-described Published Unexamined Utility Model Registration Application No. 121451/1987. Each oil hole is made to open, out of both end surfaces, into that end surface of each gear shaft supporting each planet gear which lies on the outer side surface, and a ring-like thin plate is also provided on respective outer surface. However, since the ring-like thin plate must be mounted with a clearance from the end surface of each gear shaft as described above, there is a disadvantage in that each of the ring-like thin plates protrudes out of the side plate and consequently that the axial dimension of the carrier becomes large.

In view of the above-described disadvantage, the present invention has a second object of providing a double planetary carrier in which the gear shafts and the planet gears can sufficiently be lubricated without using the above-described ring-like thin plates.

According to the present invention, the above-described first object is attained by a double planetary carrier for carrying therein two sets of planet gears, one set being axially set apart from the other set, comprising: a first carrier having a pair of side plates which face each other with one set of said planet gears on one axial side being interposed therebetween, said side plates being connected together via intermediate pieces; a second carrier having a pair of side plates which face each other with the other set of said planet gears on the other axial side being interposed therebetween, said side plates being connected together via intermediate pieces, the side plate on the other axial side of said first carrier being defined to be a first side plate, the side plate on the one axial side of said second carrier being defined to be a second side plate; wherein said first side plate and said second side plate are disposed axially opposite to each other; one of said first side plate and said second side plate has on a periphery thereof a cylindrical portion for receiving therein the other of said first side plate and said second side plate; and said cylindrical portion and a periphery of the other of said first side plate and said second side plate have serrated teeth for engagement with a play therebetween, whereby said first carrier and said second carrier are engaged by means of serrations.

In order to function as a double planetary carrier, the torque transmission between the first carrier and the second carrier must be made without failure. This requirement can be met by engaging the two carriers by means of serrations.

Further, since the serrated engaging portion is provided with a play, both carriers are relatively diametrically movable when the two sets of planet gears are engaged with the sun gears. Therefore, the two sets of planet gears are automatically aligned relative to the sun gears with the result that the relative positional accuracy of the two sets of planet gears can be secured.

According to another aspect of the present invention, the above-described second object can be attained by a double planetary carrier for carrying therein two sets of planet gears, one set being axially set apart from the other set, comprising: a first carrier having a pair of side plates which face each other to support, in a throughgoing manner, gear shafts which rotatably support one set of said planet gears on one axial side, said side plates being connected together via intermediate pieces; and a second carrier having a pair of side plates which face each other to support, in a throughgoing manner, gear shafts which rotatably support the other set of said planet gears on the other axial side, said side plates being connected together via intermediate pieces, the side plate on the other axial side of said first carrier being defined to be a first side plate, the side plate on the one axial side of said second carrier being defined to be a second side plate; wherein said first side plate and said second side plate are connected together in a manner axially opposite to each other; each of said gear shafts has an oil hole which opens into an end surface thereof which is exposed to facing surfaces of said first side plate and said second side plate; and radial grooves are provided between said first side plate and said second side plate so as to reach opening portions of said respective oil holes.

According to this double planetary carrier, grooves to introduce by centrifugal force lubricating oil to the oil hole of each gear shaft are secured in that space between the first side plate and the second side plate which serves as a connecting portion between the first carrier and the second carrier. Therefore, it becomes not necessary any more to mount a conventional ring-like thin plate on the axially outer side of each carrier. It is thus possible to shorten the axial dimension of the double planetary carrier without impairing the ease with which the lubricating oil can be supplied.

It is acceptable to cut or provide grooves on the facing surfaces of the first side plate and the second side plate respectively. However, if an oil plate provided with radial grooves is interposed between the two side plates, the grooves can be easily and advantageously secured.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

One embodying example of the present invention will now be explained with reference to the accompanying drawings.

Figure 1:
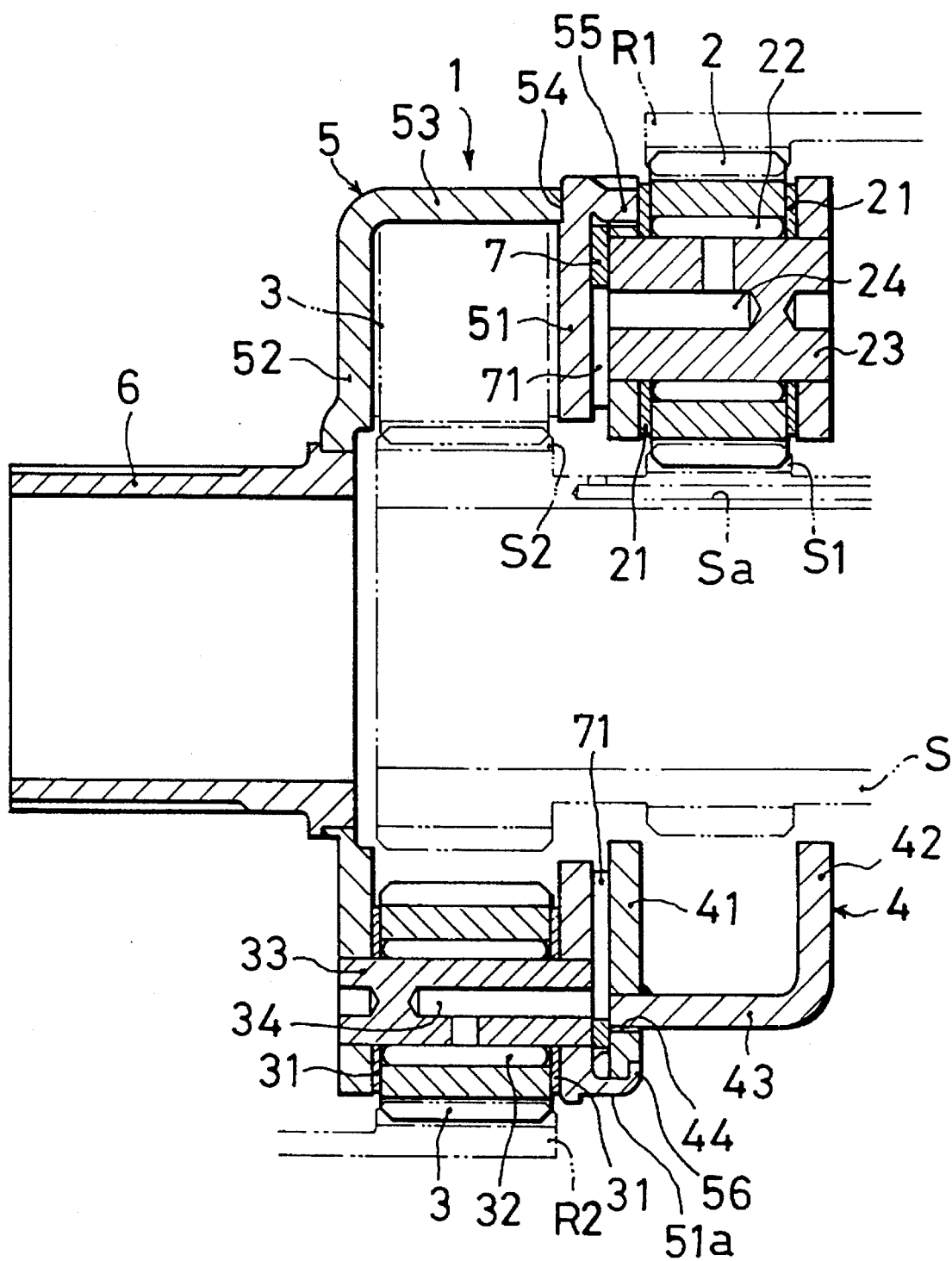
FIG. 1 is a vertical sectional view of one embodiment of a double planetary carrier according to the present invention.
Figure 2:
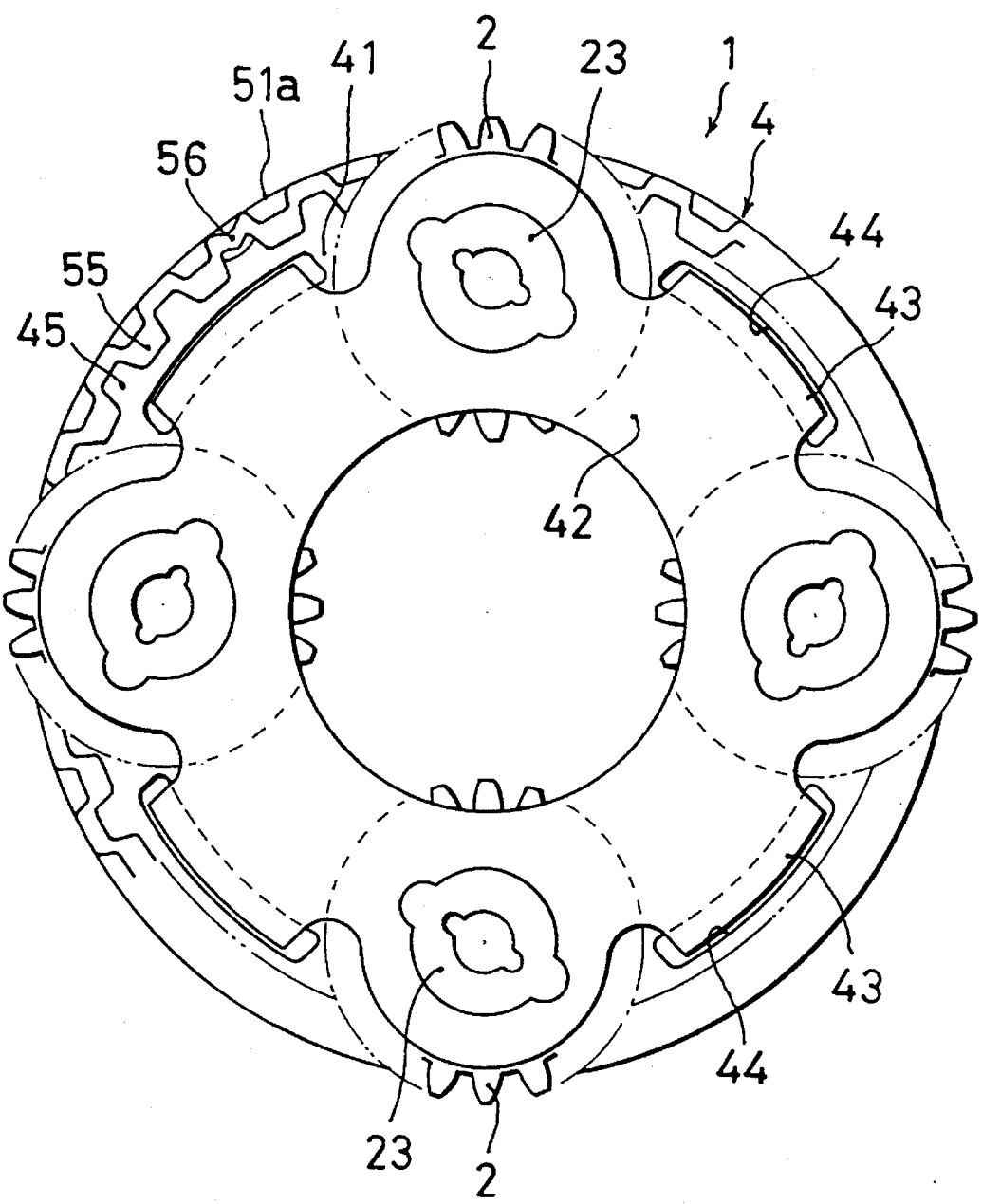
FIG. 2 is a right-side side view thereof.
Figure 3:
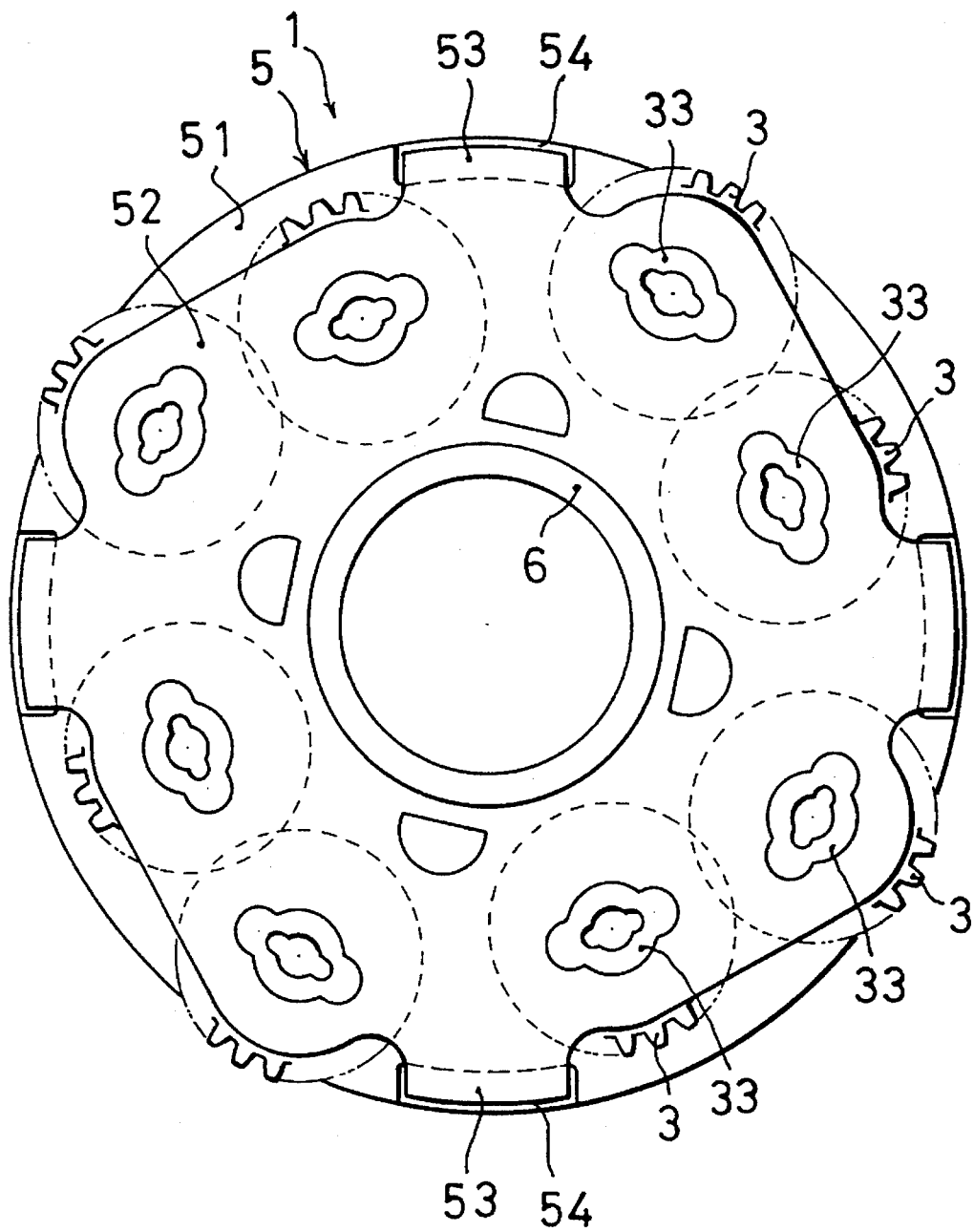
FIG. 3 is a left-side side view thereof.

Referring to FIGS. 1 through 3, numeral 1 denotes a double planetary carrier. Two sets of planet gears 2, 3 which are axially set apart (or set apart in an axial direction) from each other are carried in the carrier 1.

The carrier 1 is made up by connecting together a first carrier 4 for carrying therein four pieces of planet gears 2 which are disposed on axially one side and a second carrier 5 for carrying therein four pairs of dual planet gears 3 which are disposed on axially the other side. The two sets of planet gears 2, 3 are engaged with sun gears S1, S2 which are mounted on a common sun gear shaft S, as well as with respective ring gears R1, R2, thus constituting a planetary gear mechanism. An output is taken out via a hub 6 which is mounted on the second carrier 5.

The first carrier 4 and the second carrier 5 are provided with side plates 41, 51 which are positioned on an axially inner side and side plates 42, 52 which are positioned on an axially outer side. Each of the carriers 4, 5 is made by welding front ends of intermediate pieces 43, 53 which are formed by bending axially inwards in a plurality of positions in the circumference of the outer side plates 42, 52, to the inner side plates 41, 51. In the first carrier 4, a plurality of connecting holes 44 are formed in the inner side plate 41. The front end of each intermediate piece 43 is respectively inserted into the hole 44 and is welded together. In the second carrier 5, a plurality of coining-finished seats (or seats which are subjected to mechanical finishing of coining) 54 are formed on the rear surface of the inner side plate 51. The front end of each intermediate piece 53 is abutted to the coining-finished seats 54 to weld them together.

After each of the carriers 4, 5 has been manufactured as described above, each set of planet gears 2, 3 are inserted into the space between both side plates of each carrier 4, 5 in a condition in which washers 21, 31 are placed in contact with both ends of the planet gears. Then, gear shafts 23, 33 which penetrate through needle bearings 22, 32 mounted on an inner circumference of the planet gears 2, 3 are assembled so as to extend across both side plates. Both ends of the respective gear shafts 23, 33 are then caulked to fix them to the respective carriers 4, 5, thereby assembling the carrier assembly. On a periphery of the inner side plate 51 of the second carrier 5, there is formed a cylindrical portion 51a for receiving therein the inner side plate 41 of the first carrier 4 which lies to face the side plate 51. Outward-projecting and inward-projecting serrated teeth 45, 55 are respectively formed on the periphery of the side plate 41 and on the cylindrical portion 51a so that the first and the second carriers 4, 5 may be serration-engaged or engaged by means of serrations.

Figure 4:
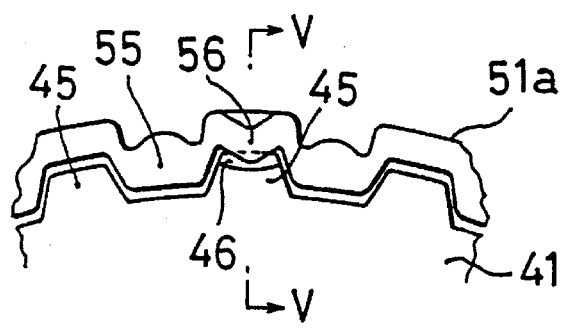
FIG. 4 is an enlarged view of serrated connecting portion between a first carrier and a second carrier.
Figure 5:
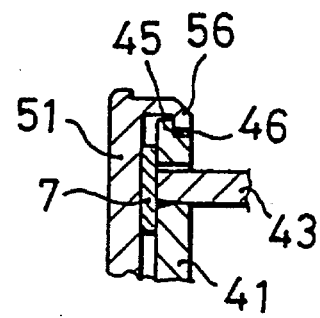
FIG. 5 is a sectional view taken along the line V—V in FIG. 4.

As shown in FIGS. 4 and 5, in a plurality of circumferential portions of the rear surface of the side plate 41 of the first carrier 4, there are formed dented groove portions 46 which are positioned in tooth crest portions of the serrated teeth 45. A plurality of circumferential portions at the tip of the cylindrical portion 51a are caulked diametrically inwards at tooth bottom portions of the serrated teeth 55. These caulked portions 56 are engaged with the dented groove portions 46 so as to connect the two carriers 4, 5 axially immovably, thereby constituting the double planetary carrier 1. The following arrangement may also be employed. Namely, the cylindrical portion 51a is formed in a manner to project towards the rear side of the side plate 41. On the internal circumference of this projected portion, a cir-clip to be engaged with the rear surface of the side plate 41 is mounted to thereby axially connect both carriers 4, 5.

The above-described serrated teeth 45, 55 are formed, as shown in FIG. 4, so as to be engaged with each other with a play therebetween. Therefore, when the two sets of planet gears 2, 3 are to be engaged with the sun gears S1, S2, the two carriers 4, 5 are moved relative to each other so that the two sets of planet gears 2, 3 are automatically aligned relative to the sun gears S1, S2.

Figure 6:
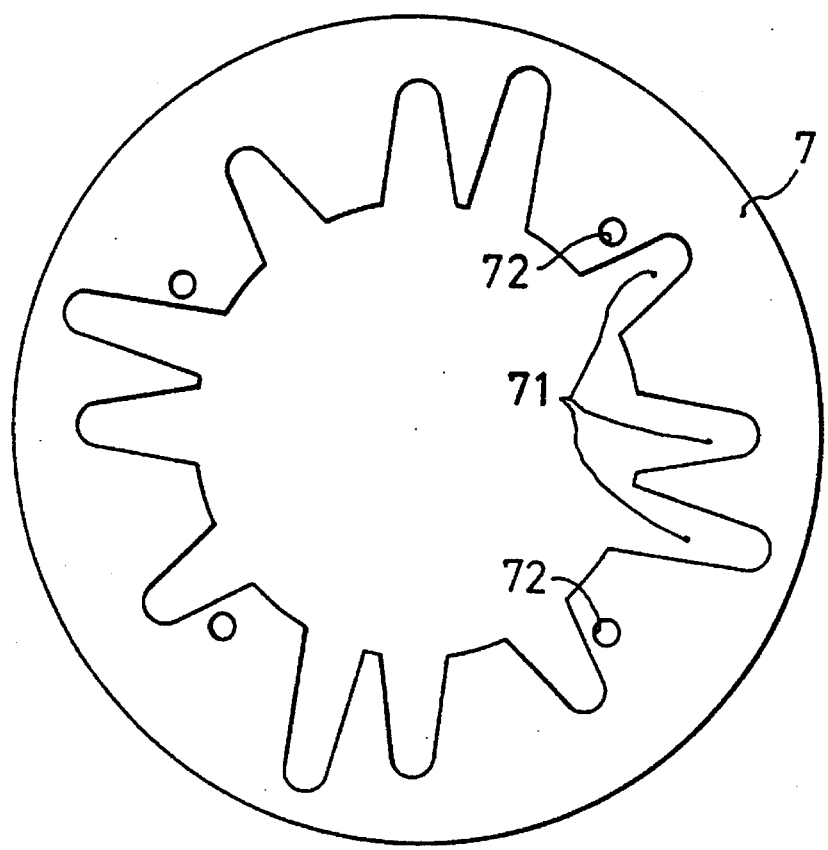
FIG. 6 is a side view of an oil plate to be interposed between the two carriers.

Between the inner side plates 41, 51 of both carriers 4, 5 there is interposed an oil plate 7 which is made of rubber and has formed therein a plurality of radial oil grooves 71 as shown in FIG. 6. This oil plate 7 is so arranged as to supply lubricating oil to be supplied from an oil hole Sa formed in the sun gear shaft S, via each of the oil grooves 71, to oil holes 24, 34 which are formed in the gear shafts 23, 33 of the respective planet gears 2, 3. The oil holes 24, 34 are arranged to open into those end surfaces of the respective gear shafts which are exposed to the facing surfaces of the side plates 41, 51. As illustrated, the diameter of the inner fringe of the oil plate 7 is made slightly larger than the diameter of the inner fringe of the side plates 41, 51 so that the lubricating oil to be supplied from the oil hole Sa can be guided by the inner fringe of the side plates 41, 51 and is introduced into the oil grooves 71 in the oil plate 7. In the oil plate 7 there are provided positioning holes 72 for engaging them to protrusions (not illustrated) which are so provided as to extend from one of the side plates 41, 51.

Figure 7:
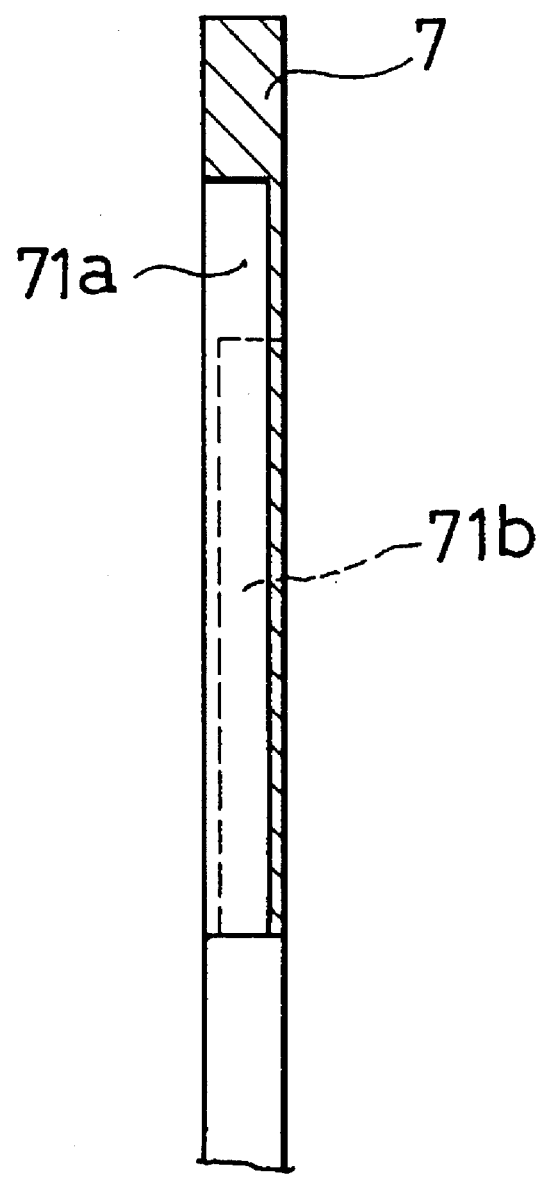
FIG. 7 is a partial sectional view of another embodiment of the oil plate.

In the above-described embodiment, the oil grooves 71 are cut so as to open into both sides of the oil plate 7. However, as shown in FIG. 7, oil grooves 71a, 71b may be provided so as to alternately open into one side surface and the other side surface of the oil plate 7. In such an arrangement, the oil grooves 71a, 71b are formed by a suitable method such, for example, as cutting, press-forming, or the like. The oil plate 7 is not limited to rubber in material, but may be formed of steel plate, aluminum plate, synthetic resin plate, or the like.

In the above-described embodiment, the first and the second carriers 4, 5 are arranged to be engaged by means of serrations. However, there will be cases where the first and the second carriers 4, 5 are connected by inserting a connecting pin to extend across the side plates 41, 51 or where the side plates 41, 51 are connected by welding. The above-described lubricating means is also applicable to those cases.

It is readily apparent that the above-described double planetary carrier meets all of the objects mentioned above and also has the advantage of wide commercial utility. It should be understood that the specific form of the invention hereinabove described is intended to be representative only, as certain modifications within these teachings will be apparent to those skilled in the art.

Accordingly, reference should be made to the following claims in determining the full scope of the invention.

What is claimed is:

1. A double planetary carrier for carrying therein two sets of planet gears, one set being axially set apart from the other set, comprising:

a first carrier having a pair of side plates which face each other with one set of said planet gears on one axial side being interposed therebetween and which are connected together via intermediate pieces;

a second carrier having a pair of side plates which face each other with the other set of said planet gears on the other axial side being interposed therebetween and which are connected together via intermediate pieces, the side plate on the other axial side of said first carrier being defined to be a first side plate, the side plate on the one axial side of said second carrier being defined to be a second side plate;

wherein said first side plate and said second side plate are disposed axially opposite to each other;

one of said first side plate and said second side plate has on a periphery thereof a cylindrical portion for receiving therein the other of said first side plate and said second side plate; and said cylindrical portion and a periphery of the other of said first side plate and said second side plate have serrated teeth for engagement with a play therebetween, whereby said first carrier and said second carrier are engaged by means of serrations.

2. A double planetary carrier for carrying therein two sets of planet gears, one set being axially set apart from the other set, comprising:

a first carrier having a pair of side plates which face each other to support, in a throughgoing manner, gear shafts which rotatably support one set of said planet gears on one axial side, said side plates being connected together via intermediate pieces;

a second carrier having a pair of side plates which face each other to support, in a throughgoing manner, gear shafts which rotatably support the other set of said planet gears on the other axial side, said side plates being connected together via intermediate pieces, the side plate on the other axial side of said first carrier being defined to be a first side plate, the side plate on the one axial side of said second carrier being defined to be a second side plate;

wherein said first side plate and said second side plate are connected together in a manner axially opposite to each other;

each of said gear shafts has an oil hole which opens into an end surface thereof which is exposed to facing surfaces of said first side plate and said second side plate; and an oil plate which has formed therein radial grooves and is interposed between said first side plate and said second side plate, said radial grooves being arranged so as to reach opening portions of said respective oil holes.

3. A double planetary carrier according to claim 2, wherein each of said radial grooves is formed to open into both side surfaces of said oil plate.

4. A double planetary carrier according to claim 2, wherein said radial grooves are formed to alternately open into one side surface and the other side surface of said oil plate.

* * * * *